United States Patent
Chavan

(10) Patent No.: US 7,607,123 B2
(45) Date of Patent: Oct. 20, 2009

(54) SYSTEMS AND METHODS FOR VALIDATING DEBUG INFORMATION FOR OPTIMIZED CODE

(75) Inventor: Shasank Kisan Chavan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 777 days.

(21) Appl. No.: 10/946,490

(22) Filed: Sep. 21, 2004

(65) Prior Publication Data
US 2006/0064676 A1    Mar. 23, 2006

(51) Int. Cl.
*G06F 9/44*    (2006.01)
(52) U.S. Cl. .................................. 717/129; 717/124
(58) Field of Classification Search .................. 717/128, 717/130, 151
See application file for complete search history.

(56) References Cited

U.S. PATENT DOCUMENTS

| | | |
|---|---|---|
| 5,371,747 A | 12/1994 | Brooks et al. |
| 5,560,009 A | 9/1996 | Lenkov et al. |
| 5,956,512 A * | 9/1999 | Simmons et al. ............ 717/128 |
| 6,263,489 B1 * | 7/2001 | Olsen et al. .................. 717/129 |
| 6,795,963 B1 * | 9/2004 | Andersen et al. ............ 717/130 |
| 7,117,483 B2 * | 10/2006 | Dorr et al. ................... 717/124 |
| 2002/0100018 A1 | 7/2002 | Click et al. |
| 2002/0170034 A1 | 11/2002 | Reeve et al. |
| 2005/0010912 A1 * | 1/2005 | Adolphson et al. .......... 717/151 |

OTHER PUBLICATIONS

"Debugging Optimized Code Without being Misled;" Max Copperman; University of California at Santa Cruz; ACM Transactions of Programming Languages and Systems, vol. 16, No. 3; May 1994; pp. 387-427.*

"Dynamic Currency Determination in Optimized Programs;" D.M. Dhamdhere et al; ACM Transaction on Programming Languages and Systems, vol. 20, No. 6; Nov. 1998; pp. 1111-1130.*

* cited by examiner

*Primary Examiner*—Lewis A Bullock, Jr.
*Assistant Examiner*—Michael Yaary

(57) ABSTRACT

An apparatus generates a debugger script to output first data corresponding to a symbol name for a breakpoint in a software program compiled as optimized code. A debugger script to output second data corresponding to the symbol name for the breakpoint in the software program compiled as unoptimized code is also generated. The apparatus further compares the first data to the second data, and indicates whether there is a difference between the first data and the second data.

20 Claims, 4 Drawing Sheets

SYSTEMS AND METHODS FOR VALIDATING DEBUG INFORMATION FOR OPTIMIZED CODE

BACKGROUND

Source code and object code refer to the "before" and "after" versions of a computer program that is compiled before it is ready to run in a computer. The source code consists of the programming statements that are created by a programmer with a text editor or a visual programming tool and then saved in a file. For example, a programmer using the C language types in a desired sequence of C language statements using a text editor and then saves them as a named file. This file is said to contain the source code. It is now ready to be compiled with a C compiler and the resulting output, the compiled file, is often referred to as object code. The object code file contains a sequence of instructions that the processor can understand but that is difficult for a human to read or modify. Many compilers include an option to generate optimized object code instructions in an effort to increase the efficiency associated with the execution of computer programs.

Optimizing a computer program generally serves to eliminate portions of computer code which are unused or unnecessary. Optimizing a computer program may restructure computational operations to be performed more efficiently, thereby consuming fewer computer resources. An optimizer is arranged to effectively transform a computer program, e.g., a computer program written in a programming language into a faster program. The faster, or optimized, program continues to preserve correctness while generally performing substantially all the same functions as the original, pre-converted computer program using fewer computations.

Debugging programs, also referred to as debuggers, allow developers to find errors in software programs by halting execution of the program at specified points. For example, the developer can set break points to halt execution of the program when a particular line in the source code is executed, when a particular variable is modified, or when a specified condition is met. While the program is halted, the developer can specify variable names to view their corresponding values. Developers can also view lines of the source code from which the executable computer program was compiled. Some debuggers also allow the programmer to fix the error and/or restart the program; trace the flow of processing through an executing program; execute the program statement by statement; redirect the flow of the program execution; send the processing to a specific place in the program; display the source program; specify conditions under which the program execution is to pass to the debugger; redirect the program output to the printer or back to the terminal screen; display the stack of subroutine return addresses, and/or remove addresses from the top of the stack.

Compilers encode debugging information in the object code, which debuggers use to map source lines with the generated machine instructions that get executed, and source variables with memory and data locations that hold the values of these variables, along with other information. Most compilers, however, only provide debugging information for unoptimized programs; not for optimized programs. As a result, address locations of variables and instructions in the address maps for the unoptimized code used by the debugger may not be aligned with the true locations in the optimized code. Optimizers that do provide information to debuggers typically do not assure that the information is accurate.

SUMMARY

An apparatus generates a debugger script to output first data corresponding to a symbol name for a breakpoint in a software program compiled as optimized code. A debugger script to output second data corresponding to the symbol name for the breakpoint in the software program compiled as unoptimized code is also generated. The apparatus further compares the first data to the second data, and indicates whether there is a difference between the first data and the second data.

BRIEF DESCRIPTION OF THE DRAWINGS

The accompanying drawings, which are incorporated in and form a part of this specification, illustrate embodiments of the invention and, together with the description, serve to explain its principles.

DETAILED DESCRIPTION OF THE DRAWINGS

Figure 1A:
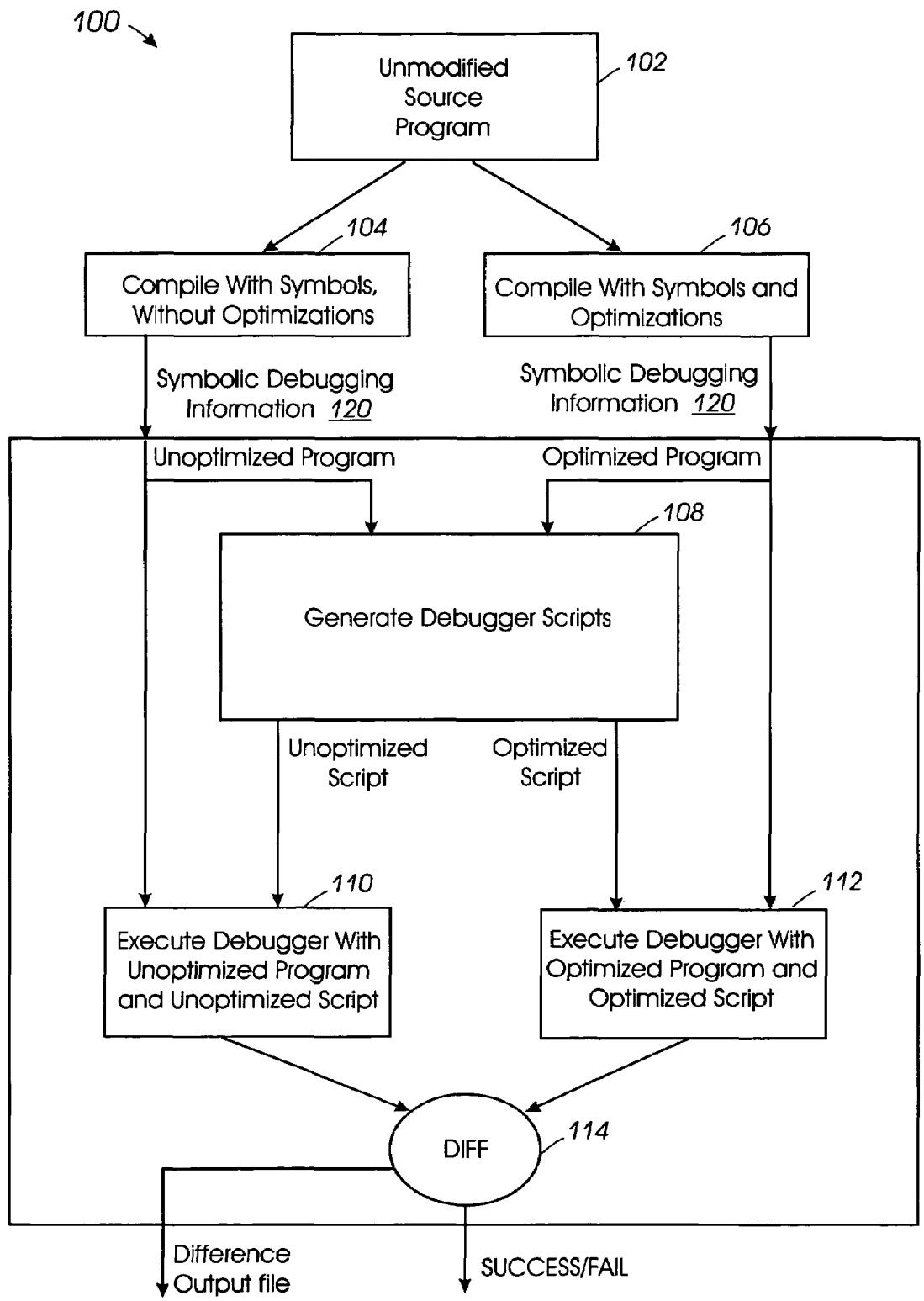
FIG. 1A shows a flow diagram of an embodiment of process for determining whether there are symbolic debugging information errors between an optimized and an unoptimized version of the object code for a computer source program.

Referring to FIG. 1A, a flow diagram of an embodiment of a process 100 for determining whether there are symbolic debugging information errors between an optimized and an unoptimized version of the object code for a computer source program 102 is shown. The results of process 100 can indicate a mismatch between the debug information for the optimized code versus the unoptimized code before the user begins a debugging session. When so alerted, the user will at least be aware that executing the optimized code with the debugger may yield inaccurate data values for the symbols viewed.

The source program 102 is compiled in sub-processes 104 and 106. Sub-process 104 generates symbolic debugging information and unoptimized code, while sub-process 106 generates symbolic debugging information and optimized code. Any suitable programming language and corresponding compiler capable of generating symbolic debugging information for both optimized and unoptimized object code from the source program can be used in process 100.

Options can be specified when the compiler is invoked to enable one or more levels of optimization. A debug option can be specified when the compiler is invoked to generate symbolic debug table 120. The program object codes generated by sub-processes 104 and 106 are input to sub-process 108. Sub-process 108 generates an unoptimized debugger script and an optimized debugger script based on the compiled programs and their corresponding debugging information. A script can be a program or sequence of instructions that is interpreted or executed by another program, such as the debugger, rather than directly by the computer processor. A script can also be one or more operating system commands that are prestored in a file and performed sequentially by the operating system's command interpreter whenever the name of the file containing the script is entered as a single command.

The scripts generated in sub-process 108 include debugger commands to set breakpoints and to output the values of a specified list of variables. Sub-processes 110 and 112 execute the debugger with the scripts for the unoptimized and optimized object code, respectively. The values emitted by the debugger are output to separate files corresponding to the unoptimized and optimized codes.

Sub-process 114 can execute a difference utility that compares the files output by the debugger. If the contents of the files are the same, then it is likely that the debug information tables for the optimized code provide accurate information for the debugger. Sub-process 114 can also provide an indicator of whether the debugging information generated for the optimized code is accurate, such as a Success/Fail parameter. Accordingly, if the contents of the files are not the same, sub-process 114 can provide the Fail indicator to inform the developer that the debugging information is not accurate for the optimized object code. Sub-process 114 can also output a file that includes the variables and lines in the program source files that are inconsistent between the optimized and unoptimized object codes.

A compilation unit typically represents the text and data contributed to executable object code by a single relocatable object file. The compilation unit may be derived from several source files, including preprocessed "include files." In some situations, the user may only be interested in viewing debug information for a subset of compilation units included in the object code. In such cases, the user can view the contents of the difference output file to determine whether the symbolic debugging information is correct for any of the compilation units of interest.

A script or other suitable technique can be implemented to invoke sub-processes 102-114 automatically. The name of the file containing the source program can be input to process 100 via an argument in a command that invokes process 100, a configuration file for process 100, or other suitable technique. The output file and Success/Fail indicator generated by sub-process 114 can be recorded on storage media in a known location, a location or file specified by the developer when the script is invoked, and/or presented on a display.

Additionally, the debugger program can be configured to compare the current version of a source program being debugged to the version of the source program used in process 100. The version information may be embedded in the source code, the object code, or deduced by the date/time the source file or object file was last saved in the file system. If the version of the object code is the same and the optimized version of the object code being debugged, then a feature can be implemented to alert the user when the results of process 100 indicated a mismatch between the debug information for the optimized code versus the unoptimized code. When so alerted, the user will at least be aware that executing the optimized code with the debugger may yield inaccurate data values for the symbols viewed.

Figure 1B:
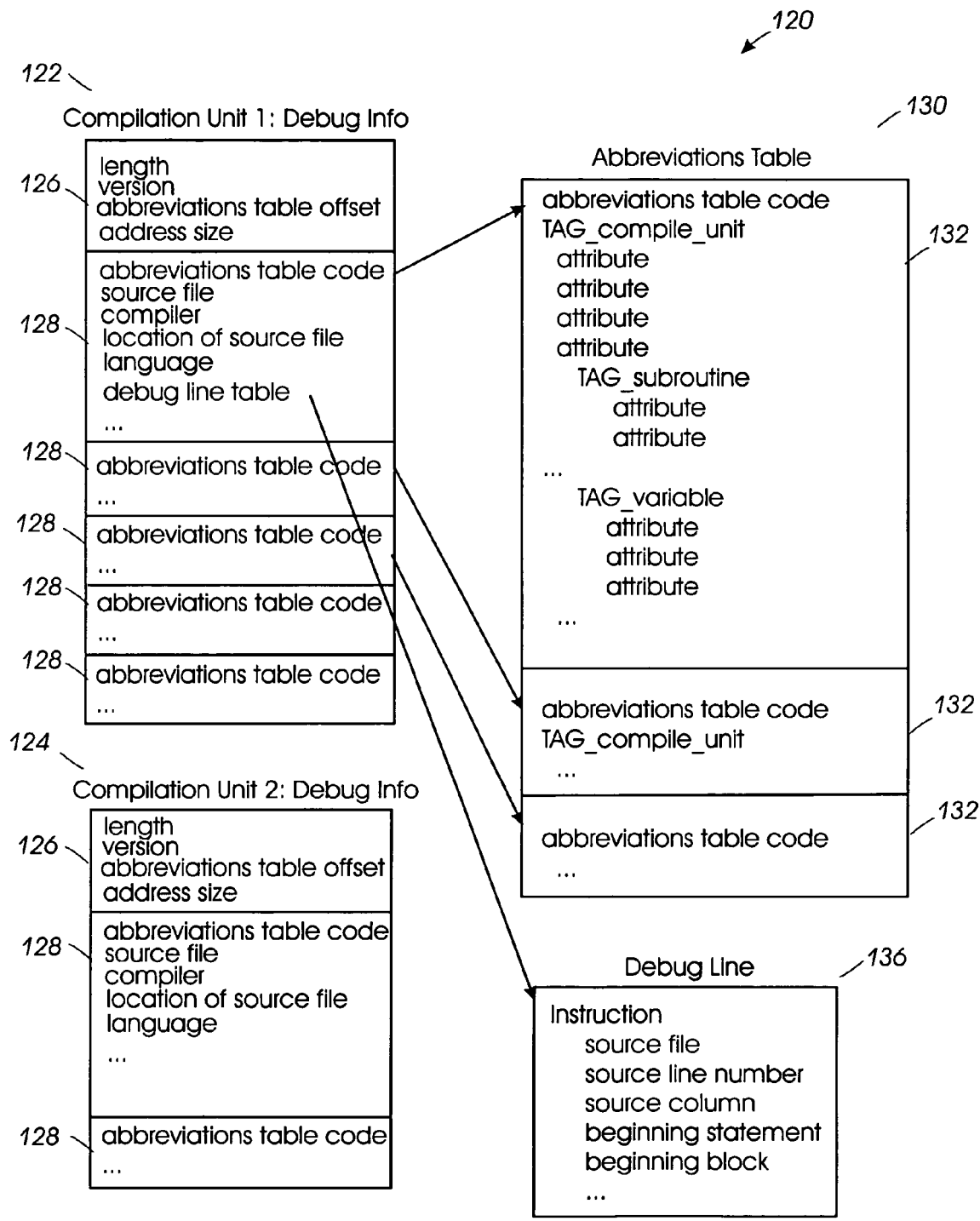
FIG. 1B shows an embodiment of a debug table that provides information to perform symbolic debugging.

Referring to FIG. 1B, an embodiment of debug table 120 is shown that, along with a symbol table (not shown), provides information that allows the debugger to perform symbolic debugging. Debug table 120 can include, for example, machine-to-source code line correlation information, file names, symbol (variable, parameter, constant) names, symbol types, and addresses for symbol names and instructions. Object code for the symbol and/or debug table 120 can be stored internal or external to a file containing the program object code. The Debug With Arbitrary Record Format (DWARF) specification is commonly used to store information in debug table 120. See, for example, DWARF Debugging Information Format, Revision: Version 2.0.0, Jul. 27, 1993. UNIX International, Program Languages SIG. DWARF represents each compilation unit in a source program with a series of entries in respective debugging information tables 122, 124. Debugging information table 122, 124 can include a header 126 followed by a series of entries 128.

Debugging information entry 128 can include a code that points to an entry 132 in a separate abbreviations table 130, as well as a code that points to a debug line table 136 for each source file in the compilation unit. Abbreviations tables 130 describe the format of debug info tables 122. Entries 132 in a corresponding abbreviations table 130 typically begins with the entry code followed by one or more tags. The tags can be followed by one or more attribute values. Each compilation unit can be associated with a particular abbreviation table 130, but multiple compilation units may share the same abbreviations table 130. Abbreviations tables 130 for compilation units can be contained in an object file section that is separate from the debugging information tables 122, 124.

Program components such as objects, modules, subprograms, variables, parameters, constants, and types, among others, can have corresponding attributes that identify other tables that include information for the components. For example, a file attribute can correspond to a file number from debug line table 136 for the compilation unit to represent the source file in which the declaration appeared. A line attribute can represent the source line number of the declared object. A name attribute can be used to represent the data object name as it appears in the source program. A location attribute can be used to describe the location of a variable or parameter at run-time. Other suitable attributes can be utilized to provide information for the compilation units.

The header 126 for a single compilation unit can include a parameter representing the length of the debugging information table 122, 124 for that compilation unit, not including the length of header 126; a parameter representing the version of the DWARF format for the compilation unit; an offset into the abbreviations table 130 for the compilation unit; and a parameter representing the size of an address on the target architecture. Other suitable parameters can be included in header 126, in addition to, or instead of, the preceding parameters.

Debug line table 136 can associate locations in the source files with the corresponding machine instruction addresses in the executable object code or the shared objects used by the executable object code. Such an association allows a user to specify machine instruction addresses in terms of the line number and the source file containing the statement. The debugger can also use debug line table 136 to display locations in terms of the source files, and to single step from line to line, or statement to statement.

The information provided in debug line table 136 can be represented as a large matrix, with one row for each instruction in the emitted object code, and columns such as the source file name, line number, column number, whether this instruction is the beginning of a source statement, and whether the instruction is the beginning of a basic block. The size of such a matrix may be impractically large. In such cases, the size of the matrix can be reduced by deleting the rows with identical file, line and source column information to that of its predecessors. Other techniques for compressing the information in debug line table 136 can be utilized.

While DWARF is used herein to provide an example of a format suitable for determining whether debugging information is accurate for optimized code, other embodiments can utilize any suitable format in addition to, or instead of, DWARF to provide debugging information.

Figure 2:
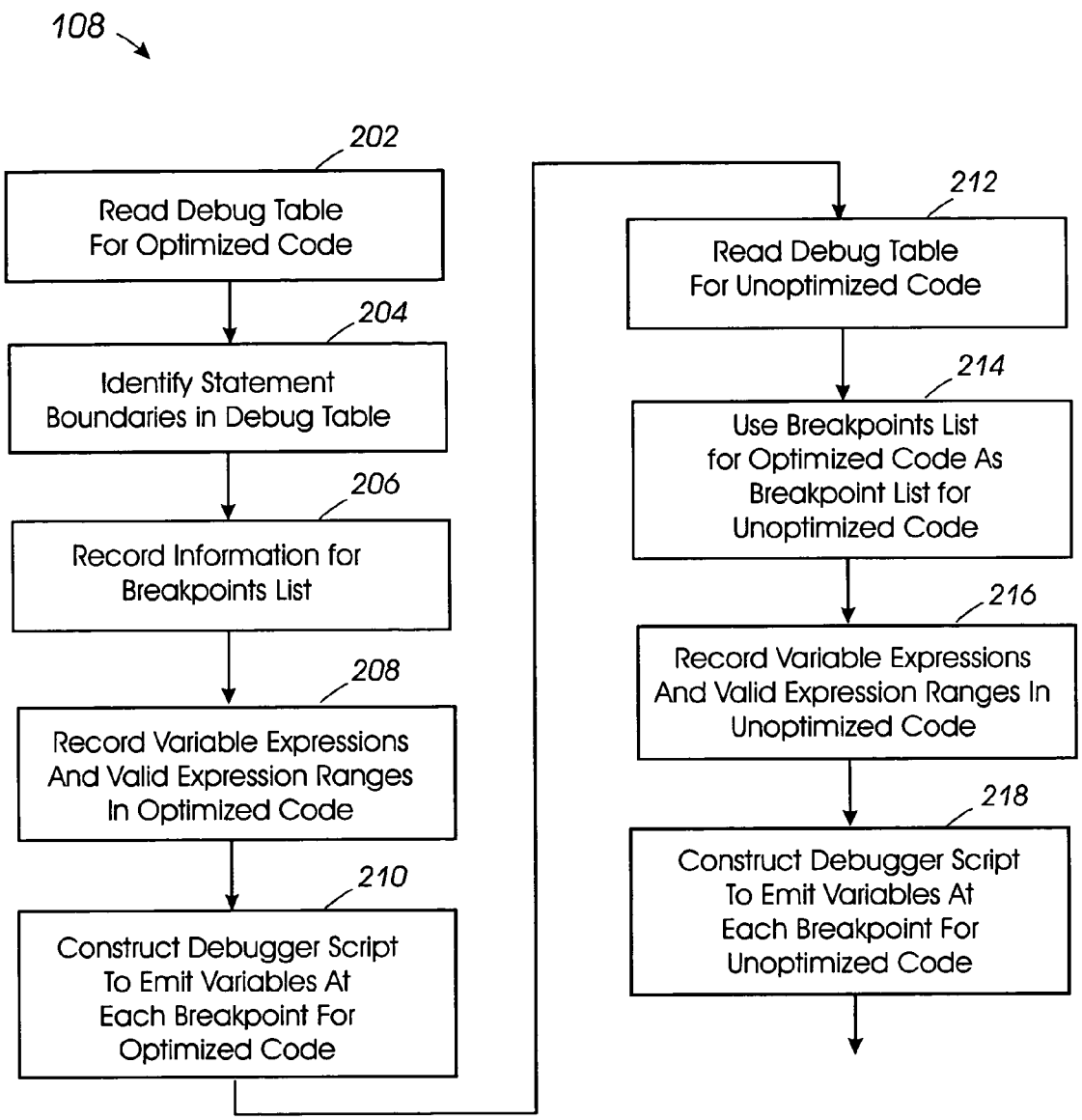
FIG. 2 shows an embodiment of a process for generating debugger scripts.

Referring to FIGS. 1A and 2, FIG. 2 shows an embodiment of process 108 for generating debugger scripts. Sub-process 202 can include reading debugging information for optimized code from a file or other storage component that contains the debug table 120.

Sub-process 204 can include identifying statement boundaries in the debug line table 136 for the optimized code. In some debugger information formats, such as DWARF, the header 126 includes an address and a length, each in the size appropriate for an address on the target architecture. The first line following the header 126 begins at an offset that is a multiple of the size of a single line (that is, twice the size of an address). The header 126 and the entries 128 can be padded, if necessary, so that the each entry 128 begins on an appropriate boundary.

Figure 3:
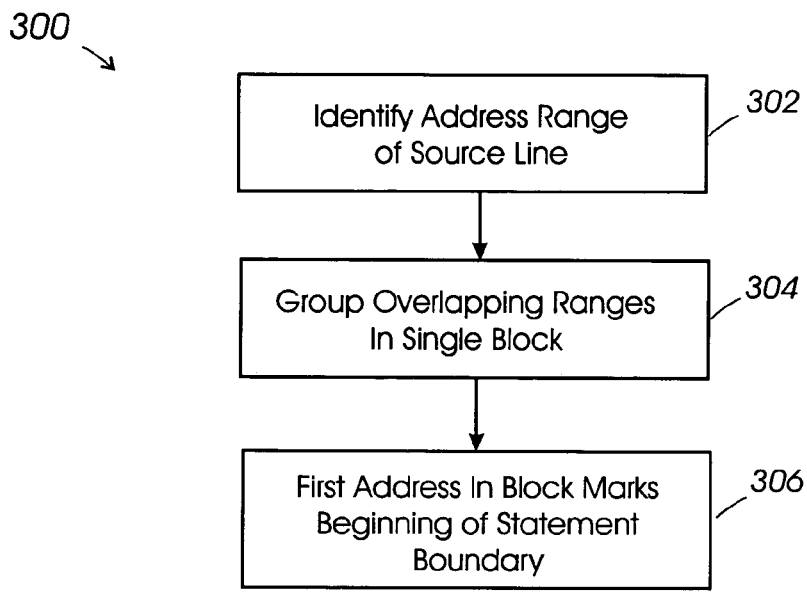
FIG. 3 shows an embodiment of a process to determine statement boundaries in a debugger information entry.

FIG. 3 shows an embodiment of a process 300 to determine the statement boundaries in situations where the symbol table formats do not support a "statement boundary" field in each entry of the debug line table 136. Sub-process 302 can include identifying the range for each source line identified in the debug line table 136, that is, the minimum and maximum addresses of instructions corresponding to that source line. Sub-process 304 can include grouping the overlapping ranges together into a single block to produce a final set of disjoint ranges. In sub-process 306, the first address in each disjoint set can be used to mark the beginning of a statement boundary.

Referring again to FIGS. 1B and 2, in FIG. 2, sub-process 206 can include recording information from debug line table 136 into a "breakpoints" list in the debugger script. The list can include addresses, module names, and line numbers where the debugger will be halted to collect data from the program being debugged. Sub-process 208 can include recording variable names and their associated location expressions in debug line table 136. In DWARF, a location expression consists of zero or more operations. An expression with zero operations denotes an object that is present in the source code but not present in the object code (perhaps because of optimization). The address ranges over which the expressions are valid can also be recorded.

Sub-process 210 can include placing debugger commands in the script file to set breakpoints at the code addresses identified in the breakpoints list. Debugger commands to print all variables that are valid using associated location expression(s) for the variables can be entered in the script for each breakpoint. The variables to emit, and the location expression to use can depend on whether or not the code address for the particular breakpoint fits within the address range for the particular variable and location expression. Bulk commands for dumping all variables in an active stack at a particular breakpoint and/or for a particular object or module specified as an argument can be used instead of listing every variable and its location expression in the script.

Further, in some embodiments, a subset of the breakpoints list can be included in the script to reduce the amount of time required to run the scripts as well as the size of the output files. The number of breakpoints entered in the script can be based on the level of optimization performed on the compiled program, and the modules of interest within the program. For example, a developer may be interested in testing only certain modules in an executable program. In such cases, process 108 can be configured to allow the developer to specify particular modules and/or variables, and include commands in the script to set breaks only at the specified modules, and emit only the specified variables. Any attributes or other parameters required to output the specified variables for the specified modules can be found in the debug tables 120.

Sub-process 210 can also include adding a command in the script to resume the debugger executing the optimized program once the variables are emitted for a breakpoint.

Sub-process 212 can include reading debugging information for unoptimized code from a file or other suitable storage component that contains debug table 120. Sub-process 214 can include using the breakpoints list generated in sub-process 206 for the optimized program as the breakpoints list for the unoptimized program to ensure that breakpoints are set for the same source lines in both programs.

Sub-process 216 can include recording all variable names in the unoptimized program and their associated location expressions. The address ranges over which the expressions are valid can also be recorded.

Sub-process 218 can include placing debugger commands in the script file to set breakpoints at the code addresses identified in the breakpoints list for the unoptimized code. Debugger commands to print all variables that are valid using associated location expression(s) for the variables can be entered in the script for each breakpoint. In some embodiments, a Debug Location table can be included to provide a map of the variable locations for optimized code. The variables to emit, and the location expressions to use can depend on whether or not the code address for the particular breakpoint fits within the address range for the particular variable and location expression. If a variable is not available to print at a particular breakpoint in the optimized code, then the variable is not printed at that breakpoint in the unoptimized script. This is due to the fact that optimization may make the variable unavailable at certain breakpoints, and the difference in the dumps should represent only incorrect encoding of debugging information.

Sub-process 218 can also include adding a command in the script to resume the debugger executing the unoptimized program once the variables are emitted for a breakpoint. The debugger will halt when it reaches the next breakpoint in the list.

Figure 4:
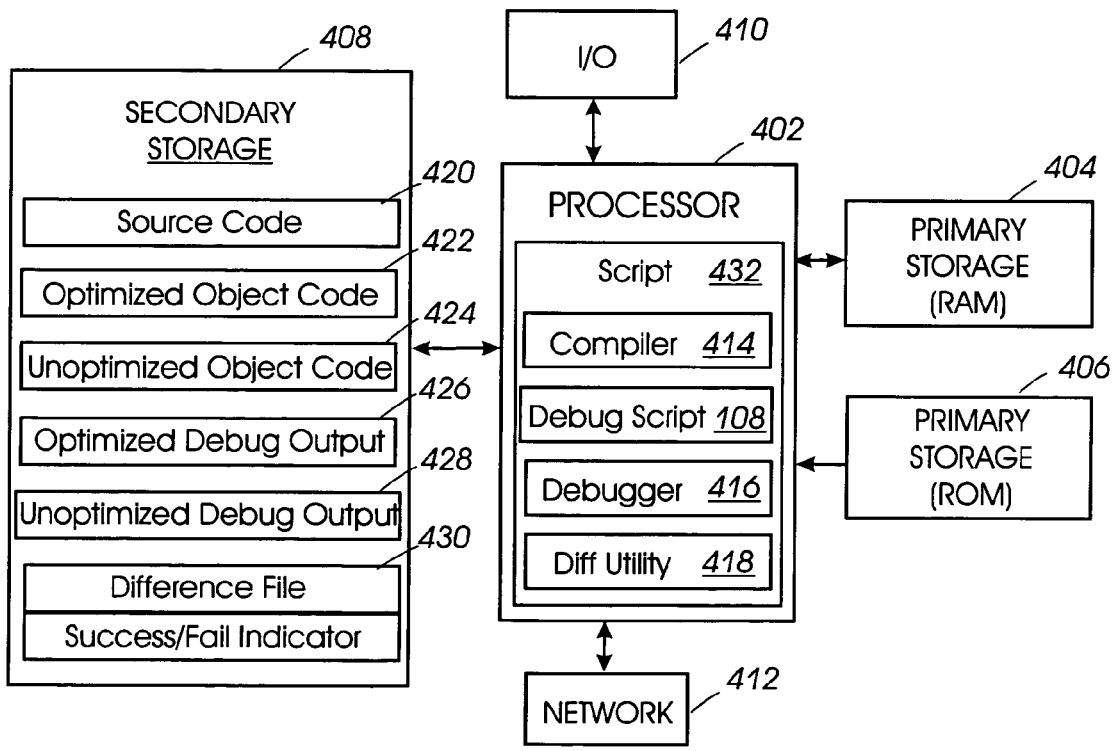
FIG. 4 shows a diagram of a typical, general purpose computer system suitable for implementing some embodiments of the present invention.

FIG. 4 shows a diagram of a typical, general purpose computer system 400 suitable for implementing some embodiments of the present invention. Embodiments disclosed herein may be implemented in a variety of computer system configurations such as servers, personal computers, handheld devices, multi-processor systems, microprocessor-based or programmable consumer electronics, network PCs, network adapters, minicomputers, mainframe computers and the like. Embodiments of the invention may also be practiced in distributed computing environments, where tasks are performed by remote processing devices that are linked through a communications network. In a distributed computing environment, program modules may be located in both local and remote memory storage devices. Additionally, some embodiments may be implemented as logic instructions and distributed on computer readable media or via electronic signals.

Computer system 400 can include any number of processors 402 coupled to one or more memory devices including primary storage devices 404, 406 such as a random access memory (RAM), and read only memory (ROM). ROM acts to transfer data and instructions uni-directionally to processor 402, while RAM is used typically to transfer data and instructions in a bi-directional manner. A specific primary storage device 406 such as a CD-ROM may also pass data uni-directionally to processor 402.

System 400 can also include a secondary storage device 408 coupled for bi-directional communication with processor 402. Secondary storage device 408 typically includes a storage medium with slower read/write access than RAM or ROM. Examples of mass memory devices such as hard disk drives or a tape. Information retained within secondary storage device 408, may, in appropriate cases, be incorporated as part of RAM 404 as virtual memory.

Processor 402 can also be coupled to one or more input/output devices 410 that may include, but are not limited to, devices such as video monitors, track balls, mice, keyboards, microphones, touch-sensitive displays, transducer card readers, magnetic or paper tape readers, tablets, styluses, voice or handwriting recognition systems, and/or other suitable types of devices. Processor 402 optionally may be coupled to a computer or telecommunications network, e.g., a local area network and/or a wide area network such as the Internet, through a network interface 412. With such a network connection, processor 402 can receive information from the network, or output information to the network in the course of performing all or portions of process 100 (FIG. 1). Such information, which can be represented as a sequence of instructions to be executed using processor 402, may be received from and output to the network, for example, in the form of a computer data signal embodied in a carrier wave.

In the embodiment shown, compiler 414, debug script generator 108, debugger 416, and diff utility 418 are loaded in processor 402. Source code 420, optimized object code 422, unoptimized object code 424, optimized debug output 426, unoptimized debug output 428, and difference file 430 are shown in secondary storage 408.

Script 432 is also shown in processor 402 and can be configured to invoke compiler 414, debug script generator 108, debugger 416, and diff utility 418. Script 432 can also direct input and output to compiler 414, debug script generator 108, debugger 406, and diff utility 418. For example, script 432 can provide the location of source code 420 to compiler 414, and invokes compiler 414 with and without compiler optimization options enabled, and a symbolic debug compiler option enabled, to generate optimized object code 422 and unoptimized object code 424.

Script 432 can also invoke debug script generator 108, providing the location of optimized object code 422 and unoptimized object code 424 as input. Debug script generator 108 analyzes the debug tables 120 (FIG. 1B) of optimized object code 422 and unoptimized object code 424 to generate another script for executing debugger 416 and diff utility 418, as described herein in the discussion of sub-processes 110-112 (FIG. 1A). The output of diff utility 418 can be stored in difference file 430, which can also include a success/fail parameter to indicate whether the debug information for optimized object code 422 is accurate.

The validity of compiler-generated debugging information for optimized code can be tested with process 100 (FIG. 1A) to address the fact that debugging information for a particular program is dynamic, not static, over time. Compiler revisions rarely change the data locations of variables denoted in the debugging information for unoptimized code. Code generation changes constantly between compiler revisions when optimizations are performed, however. As a result, the generated debugging information is almost never the same. Analysis of source code 420 and difference file 430 can help determine whether a discrepancy between optimized object code 422 and unoptimized object code 424 is due to bad debugging information for the optimized program, or incorrect code transformations applied on the optimized program. Problems with compiler optimization can thus be found and corrected.

The logic modules, processing systems, and circuitry described herein may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components are disclosed herein as separate and discrete components. These components may, however, be combined to form larger or different software modules, logic modules, integrated circuits, or electrical assemblies, if desired.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

What is claimed:

1. An apparatus comprising:
   logic instructions embedded on computer readable medium operable to cause a computer processor to:
   generate and execute a debugger script to output first data corresponding to a symbol name for at least one breakpoint in a software program compiled as optimized code;
   generate and execute a debugger script to output second data corresponding to the symbol name for the at least one breakpoint in the software program compiled as unoptimized code;
   compare the first data to the second data; and
   indicate whether there is a difference between the first data and the second data.

2. The apparatus of claim 1, further comprising:
   logic instructions operable to:
   output the first data from the optimized code to a first file;
   output the second data from the unoptimized code to a second file.

3. The apparatus of claim 1, further comprising:
   logic instructions operable to:
   read a debug line table generated by a compiler; and
   identify statement boundaries in the debug line table.

4. The apparatus of claim 1, further comprising:
   logic instructions operable to:
   output the first data and the second data for all of the symbol names in the software program.

5. The apparatus of claim 1, further comprising:
   logic instructions operable to:
   combine the at least one breakpoint for the optimized code with the at least one breakpoint for the unoptimized code.

6. The apparatus of claim 1, further comprising:
   logic instructions operable to:
   record expressions and valid expression ranges for the symbol name in the optimized code and the unoptimized code.

7. The apparatus of claim 1, further comprising:
   logic instructions operable to:

identify an address range for a line of code in the software program;
group overlapping address ranges in a separate block; and
use the first address in the block as a boundary for the line of code.

8. A computer-implemented method comprising:
determining breakpoints for a software program compiled as optimized code;
determining breakpoints for the software program compiled as unoptimized code;
generating a debugger script that includes breakpoints for the optimized object code and the unoptimized object code, and a command to output the value of at least one symbol name at each breakpoint;
executing the debugger script for the optimized code and output the value of the at least one symbol name to a first file;
executing the debugger script for the unoptimized code and output the value of the at least one symbol name to a second file;
outputting first data corresponding to a symbol name for at least one breakpoint in the optimized code;
outputting second data corresponding to the symbol name for the at least one breakpoint in the unoptimized code;
comparing the first data to the second data; and
indicating whether there is a difference between the first data and the second data.

9. The method of claim 8, further comprising:
outputting the first data from the optimized code to a first file;
outputting the second data from the unoptimized code to a second file.

10. The method of claim 8, further comprising:
reading a symbol table generated by a compiler; and
identifying statement boundaries in the symbol table.

11. The method of claim 8, further comprising:
outputting the first data and the second data for all of the symbol names in the software program.

12. The method of claim 8, further comprising:
combining the at least one breakpoint for the optimized code with the at least one breakpoint for the unoptimized code.

13. The method of claim 8, further comprising:
recording expressions and valid expression ranges for the symbol name in the optimized code and the unoptimized code.

14. The method of claim 8, further comprising:
identifying an address range for a line of code in the software program;
grouping overlapping address ranges in a separate block; and
using the first address in the block as a boundary for the line of code.

15. A system comprising:
logic instructions embedded on computer readable medium operable to cause a computer processor to:
invoke a compiler with a symbolic debug option enabled, and with and without an optimization option enabled, the compiler generates optimized object code and unoptimized object code;
generate a debugger script that includes breakpoints for the optimized object code and the unoptimized object code, and a command to output the value of at least one symbol name at each breakpoint;
execute the debugger script for the optimized code and output the value of the at least one symbol name to a first file;
execute the debugger script for the unoptimized code and output the value of the at least one symbol name to a second file;
compare the values for the at least one symbol in the first file and the second file; and
indicate whether there is a difference between the values for the at least one symbol name in the first and second files.

16. The system of claim 15, wherein the debugger script further includes a command to resume the debugger after each breakpoint.

17. The system of claim 15, further comprising:
a processor; and
a storage unit for storing the source code, and the optimized and unoptimized object codes.

18. The system of claim 15, further comprising:
logic instructions operable to:
output the values for all of the symbol names in the optimized and unoptimized object codes.

19. The system of claim 15, further comprising:
logic instructions operable to:
use the breakpoints for the optimized code as the breakpoints for the unoptimized code.

20. The system of claim 15, further comprising:
logic instructions operable to:
identify an address range for a line of code in the software program;
group overlapping address ranges in a separate block; and
use the first address in the block as a boundary for the line of code.

* * * * *